March 7, 1933.  F. J. METZGER  1,900,655
SEPARATION OF ACETYLENE
Filed Feb. 11, 1932
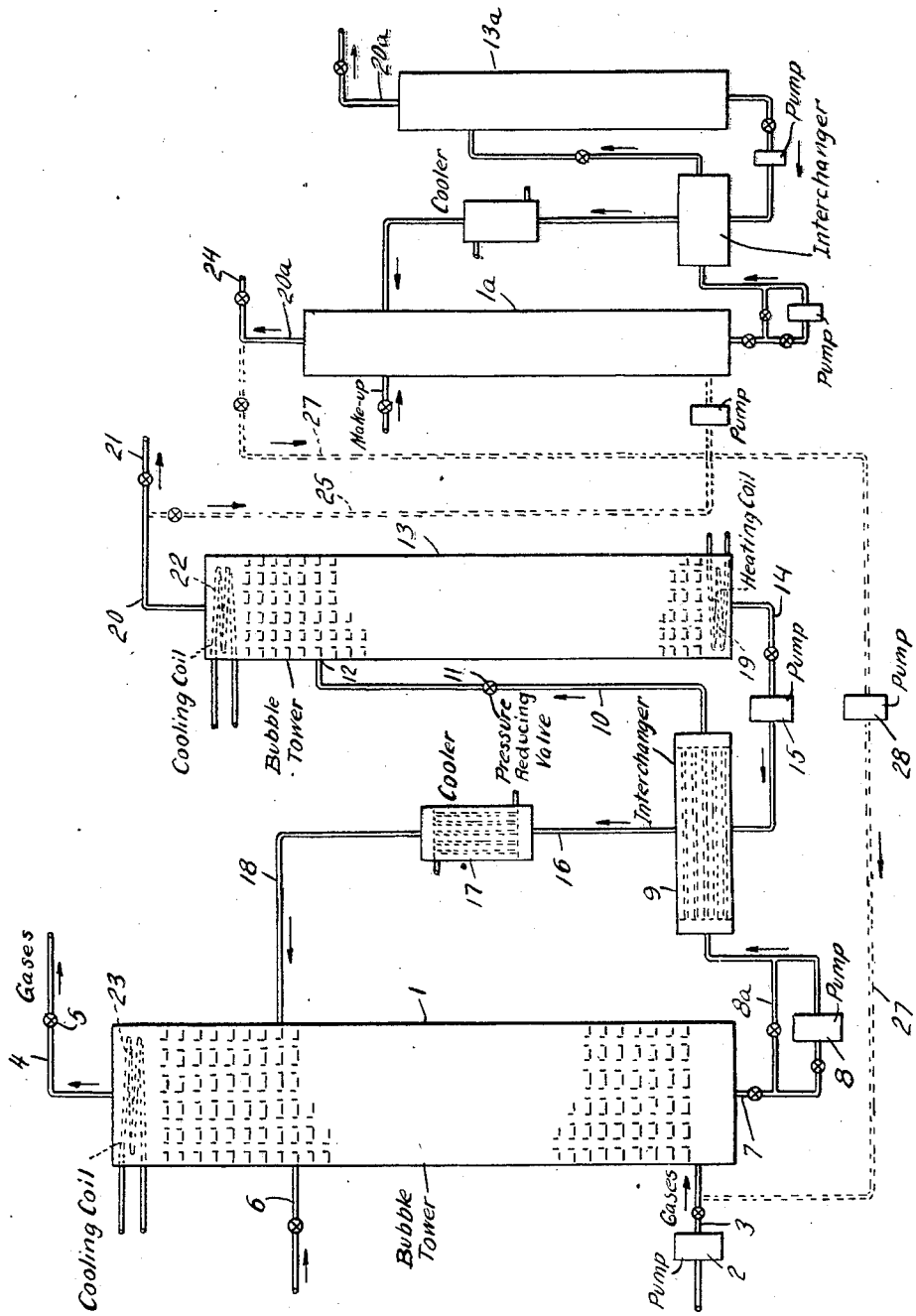
INVENTOR
Floyd J Metzger
BY
Pennie Davis Marvin Edmonds
ATTORNEYS Patented Mar. 7, 1933

1,900,655

UNITED STATES PATENT OFFICE

FLOYD J. METZGER, OF NEW YORK, N. Y., ASSIGNOR TO AIR REDUCTION COMPANY, INCORPORATED, OF NEW YORK, N. Y., A CORPORATION OF NEW YORK

SEPARATION OF ACETYLENE

Application filed February 11, 1932. Serial No. 592,304.

This invention relates to an improved method or process for the selective separation and recovery of acetylene from gaseous mixtures containing it, and particularly from hydrocarbon gases resulting from the cracking or decomposition of hydrocarbon oils or gases at high temperatures.

It is well known that when hydrocarbon oils or gases are subjected to a high temperature, either at atmospheric pressure or at higher or lower pressures, they are decomposed or cracked with the formation of new products. In cracking processes carried out at high temperatures, a considerable part of the products of the cracking operation are present as gases, usually admixed with constituents which are normally liquid in character, and, among the gaseous constituents, acetylene is often present in substantial amounts.

The products which are liquid under ordinary conditions of atmospheric temperature and pressure may be readily separated from the gaseous products by well known methods of cooling or refrigeration with subsequent condensation into liquid form. But for the separation of the gaseous constituents it has been necessary to resort to special methods of liquefaction and condensation, usually under more or less pressure. This method, while satisfactory for the separation of some of the gases, presents considerable difficulties for the removal of other gases. For example, the separation of ethylene from a mixture of gases containing it offers comparatively little difficulty by the usual liquefaction methods, whereas the separation of acetylene by similar methods is not feasible on account of the explosive hazard involved in handling liquefied acetylene.

It has been proposed to separate acetylene from mixed gases by absorbing the acetylene in acetone, in which it is quite soluble, and by subsequently heating or boiling the acetone solution in order to drive out and recover the acetylene. But acetone, while it is a good solvent for acetylene, is difficult to use in such a fractional separation process, and its use is attended with difficulty and expense. Owing to its low boiling point of about 56° C. there is a large loss of the acetone with the large amount of mixed gases brought into contact with it during the absorption operation, and further loss of acetone during the subsequent heating or boiling operation during which the dissolved acetylene is driven off, with the result that either high pressures, or refrigeration, or both, is required to reduce this objectionable and expensive loss as much as possible. Where the mixed gases contain acetlyene only in small percentage it is necessary to pass a large volume of gas into intimate contact with the acetone in order to absorb the small amount of acetylene therefrom, and the loss of only a very small percentage of acetone in the escaping gases amounts to a large loss of acetone in the aggregate owing to the large volume of gases passing into contact therewith.

The present invention provides an improved process for the selective separation and recovery of acetylene from mixed gases containing it, in which the difficulties and objections incident to the use of acetone are largely obviated or minimized, and which, in addition, can be advantageously carried out for the removal of acetylene from gases containing it, and for the production of acetylene of high purity or containing only relatively small amounts of other admixed gases.

I have found that esters of carbonic acid, such as diethyl carbonate, methyl ethyl carbonate, ethyl propyl carbonate, normal propyl carbonate, normal butyl carbonate, and the like, have a selective or preferential absorption capacity for acetylene and will selectively absorb acetylene from gaseous mixtures containing it, and that, by the use of such esters, acetylene can advantageously be absorbed from such gases and a relatively pure acetylene gas obtained by subsequent recovery of the absorbed gas therefrom.

I have found that commercially pure acetylene can be readily produced from a mixture of gases containing relatively little acetylene by absorption of the acetylene selectively in such carbonic acid esters, with subsequent expulsion of the acetylene therefrom by the aid of heat. These esters have the important advantage, among others, over acetone, that they can be used at higher absorption temperatures, without the necessity of high pressures or refrigeration or both, and with minimum loss of the ester both during absorption and subsequent distillation or recovery; although there are advantages in carrying out the present process at low temperatures and under superatmospheric pressures.

While the boiling point of acetone is only about 56° C., the boiling point of the methyl ethyl carbonate is about 109° C., that of diethyl carbonate about 126° C., and that of normal butyl carbonate about 208° C. The high boiling points of the carbonic acid esters, combined with their selective or preferential absorptive affinity for acetylene enables them to be used to advantage under conditions of temperature and pressure at which acetone cannot be satisfactorily employed, or at which excessive losses of acetone would occur.

In carrying out the present process, the raw gas mixture is brought into intimate contact with the alkyl carbonate, by sending it, preferably counter-current, through a suitable absorption tower against a stream of alkyl carbonate. The acetylene contained in the gaseous mixture is selectively absorbed, with far smaller amounts of other gases. In a suitably constructed tower, or with a sufficiently long counter-current passage of the alkyl carbonate and gases, the acetylene can be completely removed from the gases, or substantially so, even when relatively small percentages of acetylene are present therewith. The gases escaping from the tower can therefore be more or less completely freed from acetylene and utilized as fuel gases or for other purposes.

The liquid removed from the bottom of the absorption tower and containing the absorbed acetylene together with small amounts of other gases, is passed to a boiler or expeller, which may similarly be a counter-current tower, from the top of which the gases, driven off by heating, escape, and may be collected as a whole, or in fractions, as desired. The liquid from the boiler or expeller, and from which all or the greater part of the acetylene has been driven off, is cooled and returned to the absorption tower. It is advantageously passed through a heat interchanger in heat interchanging relation with the incoming liquid from the absorption tower from which the gases are to be expelled, so that this liquid is preheated before it reaches the boiler or expeller, and so that the returning liquid is cooled before it returns to the absorber. This liquid from the interchanger can be still further cooled by means of a water cooler if desired before returning to the absorption tower for reuse in the cycle.

The same carbonic acid ester or esters can be used repeatedly, in a cyclic manner, for selectively absorbing acetylene from the gaseous mixture, and with subsequent heating to expel the acetylene, followed by cooling and return for further use in the absorption step of the process.

Where the acetylene gas obtained as the result of a single absorption operation is not of sufficient purity, it can be further treated in a manner similar to that in which the original gaseous mixture was treated, that is, by passing it through another absorption tower containing a carbonic acid ester absorbent and selectively absorbing the acetylene, and then expelling the acetylene from the absorbent, to give an acetylene gas of much higher purity. This further increase in purity of the acetylene, and corresponding removal of small admixed amounts of other hydrocarbons from admixture therewith, can be repeated one or more times to give an acetylene gas of the purity required. The gases escaping from the absorption tower of such subsequent cycles, and containing acetylene along with other admixed gases can advantageously be returned to the first cycle and admixed with the fresh gaseous mixture.

The properties of the carbonic acid esters are such that the process can be carried out at ordinary atmospheric pressure, and with the absorption tower at atmospheric temperature, but there are advantages in operating the absorption step at lower temperatures, and at higher pressures, I have found that the solubility of acetylene in the alkyl carbonates is relatively much greater at low temperatures than is the solubility of the other gases, that is, the difference in solubility or in preferential solubility becomes greater as the temperature decreases. The preferential absorption of the acetylene can also be promoted by operating under high pressures, which may be as high as one thousand pounds or more to the square inch in the absorption part of the apparatus. The use of high pressures makes possible the use of apparatus of smaller size, increases the absorption capacity of the ester for the acetylene, and enables a much smaller amount of the ester to be employed for a given output of acetylene. So also, I have found that when the raw gaseous mixture is passed into intimate contact with the alkyl carbonate under high pressures, a relatively high purity acetylene may be produced in a single operation, particularly when the gases are subsequently removed in successive fractions since, when the high pressure is released, a large proportion of the impurities or other gases which may be absorbed in relatively smaller amounts, are released from the liquid, giving a gaseous mixture relatively higher in impurities and lower in acetylene, while the subsequent fractions of gases evolved when the liquid is subsequently heated will contain a high percentage of acetylene. The gases given off in the first fraction can be returned to the compressor and to the absorption step of the cycle.

It will be evident that, where successive cycles are employed, both for absorption and for boiling off the absorbed gases, the size of the apparatus required for the successive stages, where only a much smaller amount of gas is treated, will be correspondingly smaller than the apparatus used in the first stage and which operates upon a larger amount of gases, containing only relatively small percentages of acetylene.

The nature of the invention will be further illustrated by the following specific examples.

A crude gas obtained by cracking hydrocarbons and having approximately the following composition:

| | Per cent |
|---|---|
| Carbon dioxide | 0.0 |
| Acetylene | 14.6 |
| Ethylene | 9.6 |
| Carbon monoxide | 0.6 |
| Methane | 19.2 |
| Hydrogen | 53.9 |
| Nitrogen | 2.1 | was passed through diethyl carbonate at a temperature of 26° C. and at atmospheric pressure. The liquid containing the dissolved or absorbed gases was then gradually heated to the boiling point to expel the absorbed gases which were collected and had approximately the following composition:

| | Per cent |
|---|---|
| Acetylene | 74.4 |
| Ethylene | 10.9 |
| Carbon monoxide | 1.9 |
| Methane and hydrogen | 9.7 |
| Nitrogen | 3.1 |

This gaseous mixture, containing about 74.4% of acetylene, was again brought into intimate contact with diethyl carbonate at 26° C., and the resulting liquid heated to expel the gases, and the expelled gases collected. The gases showed approximately the following composition:

| | Per cent |
|---|---|
| Acetylene | 95.7 |
| Ethylene | 3.3 |
| Methane and hydrogen | 0.4 |
| Nitrogen | 0.4 |

Similar results were obtained with the use of methyl ethyl carbonate instead of diethyl carbonate.

Another crude gaseous mixture of the following composition:

| | Per cent |
|---|---|
| Carbon dioxide | 0.0 |
| Acetylene | 14.0 |
| Ethylene | 8.4 |
| Carbon monoxide | 1.6 |
| Methane | 22.4 |
| Hydrogen | 49.6 |
| Nitrogen | 4.0 | was brought into intimate contact with diethyl carbonate as the absorption liquid at a temperature of about 14° C., and the resulting liquid, when heated, gave an acetylene of about 75.1% purity on the first absorption and expulsion, and such acetylene gas, on a second absorption and expulsion treatment, gave acetylene of 95.8% purity. Substantially the same results were obtained with methyl ethyl carbonate as the absorption medium.

When diethyl carbonate was used as the absorption medium on the same crude gas, but at a lower temperature of around 0° C., the acetylene obtained after the first absorption and expulsion contained about 79.6% acetylene, and such gas, after a second absorption and expulsion, gave acetylene of about 97.7% purity. Methyl ethyl carbonate gave approximately the same results.

A crude gas of the following composition:

| | Per cent |
|---|---|
| Acetylene | 10 |
| Ethylene | 20 |
| Methane and hydrogen | 68 |
| Nitrogen | 2 | when brought into intimate contact with diethyl carbonate at 26° C., and the absorbed gas then expelled from the liquid, gave a gas containing 59% acetylene. When the same crude gas was absorbed in diethyl carbonate at 0° C., the gas obtained on expulsion contained 67% acetylene; and when the absorption was carried out at −20° C., the acetylene gas obtained contained 72% acetylene after a single absorption. Accordingly, an acetylene gas of higher purity can be obtained by a single absorption, when the absorption is carried out at lower temperatures.

I have found further that gases other than acetylene, which may be absorbed in the alkyl carbonate in much smaller amounts, are driven from solution at lower temperatures than is acetylene when similarly absorbed. It is therefore of advantage, when a relatively high purity acetylene is to be obtained, to expel the absorbed gases fractionally by the application of heat, or by the reduction of pressure followed by the application of heat. For example, I have found that after absorbing crude gases such as above mentioned in diethyl carbonate and then gradually raising the temperature of the liquid to expel the gases, most of the impurities, such as methane, ethylene, hydrogen, etc., are expelled by the time the liquid reaches 100° C., while the gas subsequently expelled at temperatures above 100° C. is relatively quite rich in acetylene. For example, I have collected a gas fraction coming off below 100° C. containing approximately 65% of acetylene, and a second fraction coming off between 100° and the boiling point of the liquid containing from 85 to 95% acetylene.

The fractional expulsion of the absorbed gases, or the collection of the expelled gases in fractions, thus makes possible the production of acetylene of higher purity even where there is only a single absorption and expulsion.

Similarly, when the process is carried out with absorption of the gases in the alkyl carbonate under high pressures, the expulsion can be carried out fractionally, and successive fractions obtained, with acetylene of higher purity in the second or later fractions. When operating, for example, at a pressure of around 150 pounds with a raw gaseous mixture containing about 10% of acetylene, the gases coming off when the pressure is released from the absorbing liquid will contain upwards of 60% of acetylene, and these gases may be collected separately and returned to the cycle through the compressor, or they can be collected together with the gases subsequently evolved when the absorption liquid is heated. If the gases evolved in the heating operation are collected separately from those evolved on the release of pressure, an acetylene gas can be obtained containing around 85 to 90% or more of acetylene. By returning to the cycle the gases evolved on release of pressure, a richer incoming gas is obtained. Operating in this manner, the gases evolved on release of pressure, as well as those obtained by heating the liquid, are proportionately richer in acetylene, and that obtained by heating the liquid may contain as high as 95% or more of acetylene.

For certain commercial purposes, an acetylene gas of the highest purity is not required, and a gas which contains varying amounts of other gases admixed with the acetylene is entirely satisfactory. Where, however, an acetylene gas of higher purity is required, this can be readily obtained, for example, by the use of lower temperatures, or by fractional collection of the gases, or by subjecting the gases to a further absorption and expulsion treatment, etc.

The apparatus required for carrying out the present process includes an absorption tower in which the raw gaseous mixture can be brought into intimate contact with the alkyl carbonate, and a boiler or expulsion tower where the absorbed gases are removed. When the absorption is carried out under pressure, the absorption tower must be constructed to withstand pressure, the gases and absorption liquid must be supplied under pressure, and the expulsion of the acetylene can be in part accomplished by reduction of pressure on the liquid. In a cyclic apparatus, a heat interchanger is advantageously provided between the absorption tower and the boiler so that the hot absorption liquid coming from the boiler can be used to preheat the absorbent containing the dissolved gases going from the absorber to the boiler, with saving of heat for heating the liquid in the boiler.

Both the boiler or expulsion tower and the absorption tower can be constructed to operate in a counter-current manner, using, for example, bubble towers in which intimate contact of the liquid and gases occurs, with resulting rectification in the boiler and effective counter-current absorption in the absorber.

An arrangement of apparatus, somewhat in the nature of a flow sheet or diagrammatic layout, is illustrated in a conventional manner in the accompanying drawing in which the absorption tower 1 is shown as a bubble tower to which the crude gaseous mixture is supplied by the pump 2 and pipe 3 at a point somewhat above the bottom of the tower, and from which the scrubbed gases escape at the top through the line 4 having pressure reducing valve 5 therein for use in case the absorption is carried out under pressure. Fresh alkyl carbonate for charging the absorption tower initially, and for making up for losses, is introduced through the pipe 6.

The alkyl carbonate containing the dissolved gases escapes from the bottom of the absorption tower 1 through the line 7 and is pumped by the pump 8 or passed through the bypass 8a to the heat interchanger 9 where the liquid is preheated and then passed through the line 10 having a pressure reducing valve therein to the tower 13 where it enters at 12 at a point somewhat below the top of the tower. When the absorption tower 1 is operated at atmospheric pressure the liquid is pumped from the bottom of the tower by the pump 8 to tower 13; while if the tower 1 is under a much higher pressure, the pump 8 will not be required, and the flow of the liquid from the tower 1 to the boiler 13 is controlled by the valve in the pipe 7 or the valve 11 in the pipe 10.

The boiler or expulsion tower 13 is also shown as a bubble tower, but much smaller in size than the absorption tower 1. From the bottom of this boiler the liquid returns through the line 14 and is pumped by the pump 15 through the heat interchanger 9 where the liquid is cooled and serves to preheat the liquid passing from the absorption tower 1 to the boiler, and it then passes through the line 16 to the cooler 17 where it is further cooled and then enters the absorption tower again at 18, somewhat below the top of the tower.

The boiler or expulsion tower 13 is suitably heated, a conventional heating coil 19 being shown at the bottom for heating the tower, for example, by steam under suitable pressure and at a proper temperature. The temperature will be sufficient to expel the greater part if not all of the dissolved gases and to heat the liquid to approximately its boiling point. The gases driven off from the boiler 13 escape from the top of the boiler through the line 20 having valve 21 therein. At the top of the boiler 13 is shown a cooling coil 22, through which cold water or other cooling fluid can be circulated. The arrangement is such that the upper portion of the bubble tower 13 can serve as a dephlegmator, with cooling of the escaping gases and of the liquid at the top of the apparatus so that a lower temperature can be maintained at the top of the bubble tower than is maintained at the lower portion of the tower where the liquid enters through the line 12.

The absorption tower 1 similarly has a cooling coil 23 at the upper portion thereof so that the upper portion of the tower, above the point where the lines 6 and 18 enter, can serve as a dephlegmator to maintain a lower temperature at the top of the tower from which the gases escape than is maintained at the lower portions of the tower.

The provision of suitable pressure regulating valves and pumps enables the absorption tower 1 to be operated at a much higher pressure than the boiler 13, while the provision of suitable cooling and dephlegmating portions of the apparatus enables the absorption to be carried out at low temperatures, and enables the loss of the absorbing liquid in the escaping gases to be reduced to a minimum.

When it is desired to further treat the acetylene gas obtained from the first absorption and expulsion cycle this can readily be accomplished in a second apparatus similar to that already described. Such an apparatus is shown, on a somewhat reduced scale, at the right of the drawing, the same reference characters being used with the suffix *a* appended thereto.

In this case, part or all of the acetylene gas escaping from the boiler 13 can be drawn off through the branch line 25 and pumped by the pump 26 into the smaller absorption tower 1*a*, where a similar absorption cycle, and subsequent expulsion, takes place, to that already described. The gases escaping from the top of the absorption tower 1*a*, through the line 20*a*, can be in part or in whole drawn off through the line 24, or they can be in part or in whole recycled through the line 27 and pumped by the pump 28 back for admixture with the raw gases entering the tower 1 through the line 3. The acetylene gases escaping from the boiler 13*a* through the line 20*a* will be acetylene gases of higher purity, as hereinbefore explained.

While I have described one arrangement of apparatus, and one construction of apparatus, it will be evident that the invention is not limited thereto, and that variations and modifications can be made therein, and other suitable forms of apparatus employed in carrying out the improved process of the present invention.

I claim:

1. The method of effecting the selective separation and recovery of acetylene from gaseous mixtures containing it in admixture with other hydrocarbons which comprises bringing the gases into intimate contact with an alkyl carbonate and thereby effecting selective absorption of the acetylene from the gases, and subsequently heating the resulting liquid to expel absorbed acetylene therefrom.

2. The method of effecting the selective separation and recovery of acetylene from gaseous mixtures containing it in admixture with other hydrocarbons which comprises bringing the gases into intimate contact and in a countercurrent manner with an alkyl carbonate and thereby effecting selective absorption of the acetylene from the gases, subsequently heating the resulting liquid to expel acetylene therefrom, cooling the liquid after expulsion of acetylene and recirculating the liquid in a cyclic manner countercurrent with the gases to effect further selective absorption of acetylene in the further carrying out of the cyclic process.

3. The further improvement in the process of claim 2 in which the hot liquid from the expulsion step of the process is brought into heat interchanging relation with the cold liquid from the absorption step to effect cooling of the hot liquor and preheating of the cold liquor, and in which the hot liquor is then further cooled before further use in the absorption step of the process.

4. The method of effecting the selective separation and recovery of acetylene from gaseous mixtures containing it in admixture with other hydrocarbons which comprises bringing the gases into intimate contact with an alkyl carbonate and thereby effecting selective absorption of the acetylene from the gases, subsequently heating the resulting liquid to expel absorbed acetylene therefrom, and further purifying the expelled acetylene by bringing it into intimate contact with an alkyl carbonate to effect partial selective absorption of acetylene therefrom, subsequently heating the resulting liquid to expel acetylene of high purity, and returning the impure, unabsorbed acetylene and admixed gases from said second absorption treatment for admixture with the gaseous mixture in the first absorption treatment.

5. The method of effecting the selective separation and recovery of acetylene from gaseous mixtures containing it in admixture with other hydrocarbons which comprises bringing the gaseous mixture into intimate and countercurrent contact with an alkyl carbonate under a high pressure to effect selective absorption of acetylene therefrom, subsequently releasing the pressure on the resulting liquid to effect partial expulsion of absorbed acetylene and heating the liquid to effect further expulsion of absorbed acetylene therefrom.

6. The further improvement in the process of claim 1 in which the heating of the liquid is effected in successive stages with fractional separation and recovery of acetylene from the successive stages, thereby effecting recovery of acetylene of increased purity in the later expelled fraction.

7. The further improvement in the process of claim 1 in which the selective absorption of the acetylene in the alkyl carbonate is promoted by refrigeration of the alkyl carbonate during the absorption.

In testimony whereof I affix my signature.

FLOYD J. METZGER.